(12) United States Patent
Patarin et al.

(10) Patent No.: US 7,672,456 B2
(45) Date of Patent: Mar. 2, 2010

(54) ANTI-PIRATE METHOD FOR THE DISTRIBUTION OF DIGITAL CONTENT BY PRO-ACTIVE DIVERSIFIED TRANSMISSION, ASSOCIATED TRANSMITTING DEVICE AND PORTABLE RECEIVING OBJECT

(75) Inventors: Jacques Patarin, Versailles (FR); Nicolas Courtois, Louveciennes (FR)

(73) Assignee: Gemalto SA, Meudon (FR)

( * ) Notice: Subject to any disclaimer, the term of this patent is extended or adjusted under 35 U.S.C. 154(b) by 1218 days.

(21) Appl. No.: 10/499,475

(22) PCT Filed: Dec. 19, 2002

(86) PCT No.: PCT/IB02/05520

§ 371 (c)(1),
(2), (4) Date: Jun. 1, 2005

(87) PCT Pub. No.: WO03/055131

PCT Pub. Date: Jul. 3, 2003

(65) Prior Publication Data

US 2005/0254644 A1    Nov. 17, 2005

(30) Foreign Application Priority Data

Dec. 20, 2001    (FR)    ................... 01 16585

(51) Int. Cl.
*H04L 9/00*    (2006.01)

(52) U.S. Cl. .................. 380/262; 380/200; 380/259
(58) Field of Classification Search .............. 380/262
See application file for complete search history.

(56) References Cited

OTHER PUBLICATIONS

Mayer et al. "Generalized Secret Sharing and Group-Key Distribution using Short Keys"; Jun. 1997, Compression and Complexity of Sequences 1997, Proceedings, avaiable at ieeexplore.ieee.org; pp. 30-44.*

* cited by examiner

*Primary Examiner*—Jung Kim
(74) *Attorney, Agent, or Firm*—Pehr B. Jansson; The Jansson Firm

(57) ABSTRACT

The invention concerns an anti-pirate method for the distribution of digital content by pro-active diversified transmission, associated transmitter device and portable receiving object. The method, designed to make the same information ($K_c$) available to several receivers (1) belonging to a group (G) of receivers, each receiver storing information ($SA_i$) specific to it, is characterized in that it includes the following steps: define a relation $K_c=f(K, b_i, SA_i)$ where (f) is a given function, (K) is information common to all the receivers, and ($b_i$) is information different for each receiver and for each value of the information (K); —enable each receiver to access information ($b_i$) before making ($K_c$) available; and transmit the information (K) to all receivers, just before making ($K_c$) available; so that each receiver can calculate information ($K_c$) using said relation.

13 Claims, 1 Drawing Sheet

ANTI-PIRATE METHOD FOR THE DISTRIBUTION OF DIGITAL CONTENT BY PRO-ACTIVE DIVERSIFIED TRANSMISSION, ASSOCIATED TRANSMITTING DEVICE AND PORTABLE RECEIVING OBJECT

BACKGROUND AND SUMMARY OF THE INVENTION

Numerous pay-TV channels currently fall victim to fraud. In particular, pirate cards are frequently used to view their channels. This invention proposes a new system for transmission of image decryption keys (or of the image itself) which offers numerous advantages: the system is relatively simple to implement and can react quickly if pirate cards should appear (flexibility).

If a pirate card is obtained, it is possible to find out from the exterior (i.e. just by observing its operation) what secrets it holds, which may possibly be used to find out from which real card it obtained these secrets, but especially to quickly disable all the pirate cards without disabling the legitimate cards. This is known as traitor tracing and in particular black box (traitor) tracing. Note that the invention proposed is extremely efficient and secure compared with the other systems proposed in the cryptographic literature (see references). Note also that this invention is not limited to television: the method can also be used whenever the same content must be transmitted to several authorised receivers.

The new method is characterised by very reasonable rates which are compatible with the speed limitations imposed by the communication channels. In addition, it stands out from other methods due to the very short length of the data K which is transmitted in real time in order to access the protected content: this length can be as short as just 64 bits.

The invention therefore concerns a method to make the same information ($K_c$) available to several receivers belonging to a group (G) of receivers, each receiver storing information ($SA_i$) specific to it, characterised in that it comprises the following steps:
  define a relation $K_c=f(K, b_i, SA_i)$ where (f) is a given function, (K) is information common to all the receivers, and ($b_i$) is information different for each receiver and for each value of the information (K);
  enable each receiver to access information ($b_i$) before making ($K_c$) available; and
  transmit the information (K) to all receivers, just before making ($K_c$) available;
  so that each receiver can calculate information ($K_c$) using said relation.

Advantageously, the function (f) is such that knowing a ($b_i$) and a ($SA_i$), no algorithm is known which could be used to obtain the information ($K_c$) in a realistic time and with non negligible probability, when the information (K) is not known.

Advantageously, function f is such that, knowing a certain number of ($b_1 \ldots b_n$) for a certain subgroup (G') of receivers, no algorithm is known which could be used, before knowing the current K, in a realistic time and with a non negligible probability, to produce a valid pair ($b_i$, $SA_i$) with a legitimate ($SA_i$), i not being one of the receivers 1 ... n of (G').

Advantageously, the function f has the format:

$$f(K, b_i, SA_i) = b_i \oplus E_K(SA_i)$$

where $E_K$ is a function depending on information (K) and where $\oplus$ designates a group law.

Advantageously, function ($E_K$) is a cryptographic encryption function and (K) a secret key used by this function.

Advantageously, the values ($b_i$) are sent encrypted with a key ($K_i$) specific to each receiver of a certain group (G) of receivers.

Advantageously, each value ($SA_i$) is a secret value known by the receiver of index i.

Advantageously, each ($b_i$) consists of two values $b_{1i}$ and $b_{2j}$ and equally the information specific to each receiver consists of two values $SA_i$ et $SA_j$, such that each receiver, identified by the pair of indices (i,j), combines the corresponding values $b_{1i}$ and $b_{2j}$ with the values $SA_i$ and $SA_j$ to calculate values $K_{c1}$ and $K_{c2}$ using said relation, which are in turn combined to access the information $K_C$.

Advantageously, the information $K_c$ is a key used to decrypt a digital content such as a television image.

Advantageously, the information $K_c$ can be used for several minutes by the receivers, the information K is sent several seconds in advance and the values $b_i$ are sent regularly, starting several days in advance.

Advantageously, certain receivers find at least some of their values $b_i$ in a list of values prestored in the receivers.

The invention also concerns a portable receiver object belonging to a group (G) of portable objects and comprising information processing means and information storage means, the storage means storing information ($SA_i$) which is specific to the portable object and a given function (f), characterised in that it comprises:
  means to obtain access to information ($b_i$) different for each portable object of the group (G) and for each value of the information (K); and
  means to calculate information ($K_c$) using a relation $K_c=f(K, b_i, SA_i)$ where K is information common to all the portable objects and transmitted to them.

Lastly, the invention concerns a transmitter device to make the same information ($K_c$) available to several receivers belonging to a group (G) of receivers, each receiver storing information ($SA_j$) specific to it, characterised in that it comprises:
  calculation means designed to calculate information ($b_i$) using a relation $K_c=f(K, b_i, SA_i)$ where (f) is a given function, (K) is information common to all the receivers and information ($b_i$) is information different for each receiver and for each value of the information (K); and
  transmission means designed to transmit to each receiver, a certain time before making ($K_c$) available, the information ($b_i$) associated with it, and to transmit information (K) to all the receivers, just before making ($K_c$) available.

BRIEF DESCRIPTION OF THE DRAWINGS

Other details and advantages of this invention will appear during the following description of a preferred but non-limiting method of execution, and referring to the attached drawings in which.

1 EXAMPLE OF SYSTEM

1.1 Description

Figure 1:
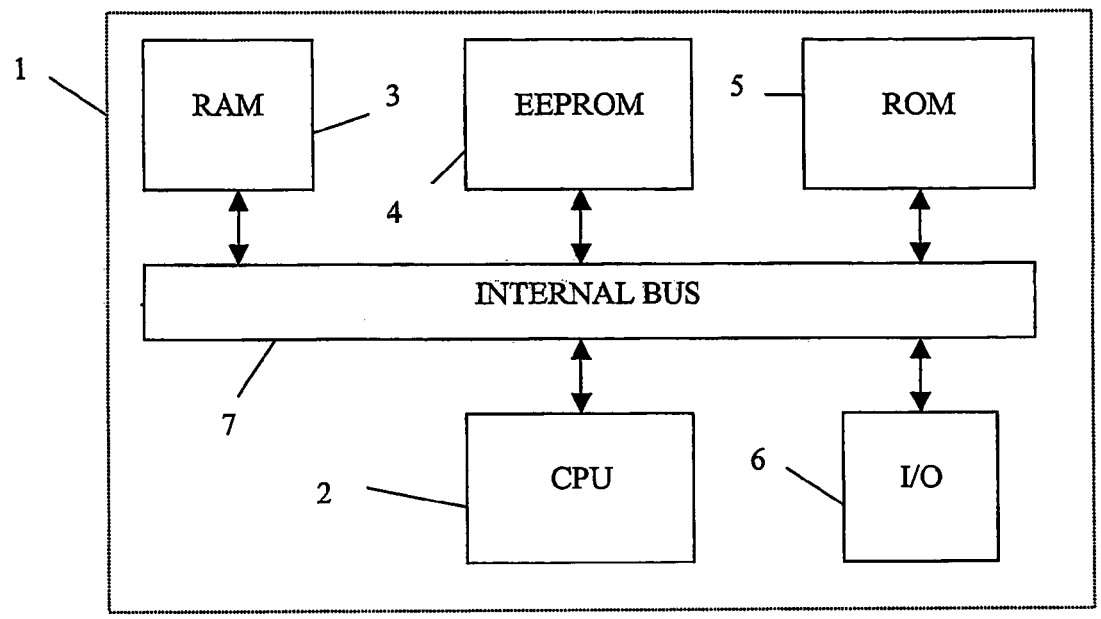
FIG. 1 represents a receiver as a smartcard type portable object.

We will consider a system for the distribution of the same information to numerous valid receivers. For example, a pay-TV system. Let $K_c$ represent the information decryption key. This key has, for example, a lifetime of 10 minutes and may require between 64 and 128 bits. We will describe a method which enables the receivers to recalculate the new value of $K_c$ every 10 minutes. Note that here, all the receivers will calculate the same value of $K_c$, although they will all have different secrets.

We will consider a receiver and call it "receiver of index i". This receiver has, here, at least two values specific to it: an encryption key $K_i$, and a secret value $SA_i$.

The organisation responsible for transmission will generate a secret key K, then calculate, for every index i, the following value:

$$b_i = K_c \oplus E_K(SA_i),$$

where E designates an encryption function, or more generally a one-way function, using a key K, and where $\oplus$ designates a group law (for example bit by bit XOR, or addition modulo 256), and it will transmit all these values $b_i$, encrypted respectively with a key $K_i$. For example, it will regularly transmit all values $b_i$ several days in advance.

Consequently, a receiver which will be in reception mode will be able, several days in advance, to decrypt the value $b_i$ (using its key $K_i$).

Then, just a few seconds before the key $K_c$ becomes useful, the transmitter will send the secret key K to all the receivers. This key can be very short, for example 64 bits. They will now be able to calculate $K_c$ by calculating $y = E_K(SA_i)$, then $K_c = b_i \oplus y^{-1}$ (if the group operation is bit by bit XOR, then $y^{-1} = y$).

Note that the "time" factor plays a very important role here: before transmitting K, none of the receivers can calculate the value of $K_c$, and they all have in memory different values $b_i$ and $SA_i$. Then, as soon as K has been transmitted, they will all, using this sole value K and their different values $SA_i$ and $b_i$, be able to recalculate the same value $K_c$.

Remember that a one-way function is one which can be calculated in one direction with no particular information, but which cannot be calculated in the inverse direction, except possibly if certain parameters are known. It is in particular a hashing function such as MD5 or SHA.

1.2 "Black Box Traitor Tracing", or how to React if Pirate Cards should Appear If pirate cards should appear, it is possible to react: firstly by detecting the secret(s) held in the card (see below), secondly by disabling all cards which have this (these) same secret(s) (see below). This can be done without changing the other cards in circulation, which will continue to operate.

1.3 Detection of Secret(s)

Firstly, assume that the secrets of a single true receiver are held in a pirate card. The valid cards will be separated into two groups with approximately the same number of elements: A and B. The true values $b_i$ for A and false values $b_i$ for B are then transmitted to the pirate card to find out whether it can still decrypt the images correctly. If yes, its secret belongs to A, otherwise it belongs to B. Then start again with two new subgroups. If there are approximately $2^n$ possible indices i, it will take approximately n attempts to find the index in question.

Note that it is not necessary to read the secrets held in the card: it is sufficient to observe its operation. If several secrets are present on the same card, the method indicated can be used to detect a $1^{st}$ secret. The transmission of values $b_i$ corresponding to this secret is then stopped, and a $2^{nd}$ secret is detected, etc. It is also possible that the pirate card could hold the secrets of several true receivers, using the secrets in a complex manner: detection then becomes more difficult, but still generally possible as long as there are not too many secrets held in the pirate card.

1.3.1 Disabling Cards with this(these) Secret(s)

Simply stop transmitting the values $b_i$ corresponding to these secrets.

2 GENERAL BASIC SETUP

A broad summary of the basic principle at the centre of the invention will be given, and more general improvements, variants and versions derived from it will be described in the following chapters.

Let G be a group of legitimate receivers. The objective is to transmit to them (and only them) a content $K_c$, consisting of all types of information (data, program, cryptographic key, etc.), especially a digital content. The content $K_c$ may in particular be a key to access a pay-TV program. The content $K_c$ is identical for all the receivers and, typically, it will change very rapidly to avoid fraudulent redistribution.

The basic principle of the invention is to transmit $K_c$ to all legitimate receivers via another key K sent in cleartext, so that each receiver has a means of calculating $K_c$ using K, which is completely different from that used by the other receivers.

Generally, this means will be a value $b_i$, transmitted well in advance, which it finds in its memory. Just before $K_c$ must be made available to the receivers, a unique value K is transmitted to all the receivers in the group G, so that each receiver can calculate $K_c$ using a function f which it has and which takes as input K, $b_i$, and a value $SA_i$ specific to it. For every index i in the group of receivers, we therefore have:

$$K_c = f(K, b_i, SA_i).$$

The time when K must be transmitted to the receivers will have to be determined according to circumstances, to ensure that a defrauder cannot recalculate $K_c$ or at least use it fraudulently, in the time between transmission of K and the time when $K_c$ is made available. Generally, K will be transmitted a few seconds or a few minutes before $K_c$ is made available.

2.1 Variants of the Basic Setup

Variant 1

For certain applications, the values $SA_i$ do not have to be secret: they can be public.

Variant 2

For certain applications, when the values $SA_i$ are secret, the values $b_i$ can be transmitted in cleartext to the receivers.

Variant 3

Function E, instead of being an encryption function, can be more generally a one-way function using a key K, for example a cryptographic hashing function such as SHA-1.

Variant 4—Prestorage of values $b_i$

Rather than transmitting the values $b_i$, they can be precalculated and prestored in the receiver, for example in flash memory, on the hard disk, CD-ROM or DVD. They can also be broadcast locally, for example via the building cable or microwaves.

3 GENERALISED SETUP

The above setup with these variants can be duplicated or replicated, which offers considerable improvements in terms of performance and detection of gangs of defrauders. We will first describe a duplicated version then later explain the general principle which allows the system to be used several times in parallel, and all the resulting benefits.

3.1 $2^{nd}$ Example of System

In this case, each receiver has, instead of the value $SA_i$ which was specific to it, two values $SA_i$ et $SA_j$, so that several receivers can have the same $SA_i$ or the same $SA_j$, but not the same $SA_i$ and the same $SA_j$ simultaneously. Each receiver is therefore characterised by a pair of indices (i, j) specific to it.

In addition, each receiver can have two encryption keys. $K_i$ and $K_j$, so that several receivers can have the same $K_i$ or the same $K_j$, but not the same $K_i$ and the same $K_j$ simultaneously. The keys $K_i$ can be used to transmit the values $b_i$ to the receivers secretly (except in the variant where the values $b_i$ are public).

The organisation responsible for the transmissions will generate two secret values $K_{c1}$ and $K_{c2}$. They are then combined to access the main key $K_c$ or to access the content directly. For example, we could have: $K_c = K_{c1} \# K_{c2}$, where # is a group law.

It then generates a key K and calculates all the values $$b_{1i} = K_{c1} \oplus E_K(SA_i)$$

and $b_{2j} = K_{c2} \oplus E_K(SA_j)$ where E designates an encryption function or more generally a one-way function, using the key K and where $\oplus$ designates a group law, and it will then transmit all these values $b_{1i}$ encrypted with key $K_{1i}$ and all the values $b_{2j}$ encrypted with $K_j$. For example, it will regularly transmit all values $b_{1i}$ and $b_{2j}$ several days in advance.

Consequently, a receiver which will be in reception mode will be able, several days in advance, to decrypt the value $b_{1i}$ (using its key $K_i$) and the value $b_{2j}$ (using its key $K_j$).

Then, just a few seconds before the key $K_c$ becomes useful, the transmitter will send the secret key K to all the receivers. They will now be able to calculate $K_c$ by calculating $y=E_K(SA_i)$, $z=E_K(SA_j)$, then $K_{c1}=b_{1i}\oplus y^{-1}$, $K_{c2}=b_{2j}\oplus z^{-1}$, then and finally $K_c=K_{c1} \# K_{c2}$.

The advantage of this $2^{nd}$ version is that fewer values $b_i$ are transmitted than with the $1^{st}$ version (since several receivers have the same values $b_{1i}$ or $b_{2j}$). Typically, it is possible to only transmit a number of $b_{1i}$ and of $b_{2j}$ approximately equal to the square root of the number of receivers.

3.2 The Replicated Generalised Setup.

Instead of duplicating the basic setup, it can more generally be replicated. Each value $b_i$ is therefore composed of one or more values: $(b_{1i}, b_{2j}, b_{3k}, \ldots)$ and each receiver is characterised by a list of indices (i, j, k, ...) and corresponding addresses $(SA_i, SA_j, SA_k, \ldots)$. The receiver characterised by the list (i, j, k, ...) uses the corresponding values $(b_{1i}, b_{2j}, b_{3k}, \ldots)$ with $(SA_i, SA_j, SA_k, \ldots)$ to decrypt the values $K_{ci}$ $(K_{c1}, K_{c2}, K_{c3}, \ldots)$ which must be combined to calculate a key to access the content $K_C$, or the content itself.

Each receiver will be identified by a list of indices, preferably unique, of the form (i), (i,j) or (i, j, k, ...) used to identify it (or to identify a small group of suspect receivers). Equally, we could say that the receiver is characterised by its group of keys or addresses according to two possible interpretations, which is its group $(SA_i, SA_j, SA_k, \ldots)$. This setup can therefore be combined with any other traitor tracing setup with known secret key, for example that described in the article *Tracing Traitors*, Crypto'94, by Benny Chor, Amos Fiat, and Moni Naor. In this case, the traditional traitor tracing protocol must specify how to distribute secrets $(SA_i, SA_j, SA_k, \ldots)$ to receivers and how to calculate the main key $K_C$ from the keys $K_{Ci}$. This must be carried out, depending on the setup used, so that for a certain number C of receivers which share their keys to build a pirate decoder, it is still possible to identify one or all of the pirates, or at least deactivate all the pirate decoders without, preventing non-pirate legitimate receivers from accessing the content. According to the method of the invention, as already explained above, there are many ways of finding the keys held in a pirate card, without disassembling the card, simply by observing its operation on a transmission in which only some of the values $b_i$ are correct. This black-box tracing property is kept in the generalisations of the basic setup, and it is therefore possible to stop transmitting the value of $b_i$ corresponding to one or more secrets $SA_i$ which are held in the pirate card. At the same time, a new value of $SA_i$ may have to be sent to the legitimate receivers (in advance, and preferably encrypted with a secret key).

3.3 Variants of the Generalised Setup

All the variants described in paragraph 2.1 for the basic setup can also be applied to the replicated setup described in section 3.

In addition, there are other groups of variants specific to the general duplicated or replicated setup:

Variant group 1: these variants consist in using other ways of distributing secrets $(SA_i, SA_j, SA_k, \ldots)$ to receivers.

Variant group 2: these variants consist in using other ways of calculating the main $K_C$ from keys $K_{Ci}$.

Variant group 3: variants where key K used to calculate the various values $(b_{1i}, b_{2j}, b_{3k}, \ldots)$ is not the same for all of these values. For example, one key can be used for all values $b_{1i}$ and a different one for the values $b_{2j}$.

Variant group 4: variants where the function $f(K, b_i, SA_i)$ used for the values $b_{1i}, b_{2j}$ etc. is not the same for all of these values. For example, one function can be used for the values $b_{1i}$ used to calculate $K_{c1}$, and a different function for the values $b_{2j}$ used to calculate $K_{c2}$.

Variant group 5: variants where the secret key $K_i$ used to transmit the values $b_{1i}$ and the values $b_{2j}$ is not the same for all receivers which use the same i, or differs for the values $b_{1i}$ and the values $b_{2i}$.

DETAILED DESCRIPTION OF THE INVENTION

A brief description will now be given of the invention in its implementation using information processing devices. It concerns a method to make the same information (Kc) available to several receivers belonging to a group (G) of receivers, from a transmitter comprising information processing means and information storage means, each receiver comprising information processing means and information storage means, the storage means of the receiver storing information (SAi) specific to it, characterised in that it comprises the following steps:

- define, in the information storage means of each receiver, a relation $K_c=f(K, b_i, SA_i)$ where (f) is a given function, (K) is information common to all the receivers, and ($b_i$) is information different for each receiver and for each value of the information (K);
- enable the processing means of each receiver to access information ($b_i$), before making ($K_c$) available; and
- transmit the information (K) to all the receivers using the processing means of the transmitter, just before making ($K_c$) available; so that each receiver can calculate information ($K_c$) using said relation, via its processing means.

FIG. 1 shows the general structure of a receiver 1 of type smartcard. It comprises information processing means or CPU 2, various types of information storage means 3,4,5 (RAM, EEPROM, ROM), input/output means 6 allowing the card to communicate with a card reader terminal, and a bus 7 allowing these various parts to communicate together. The card communicates with a remote transmitter device via the terminal (not shown).

Figure 2:
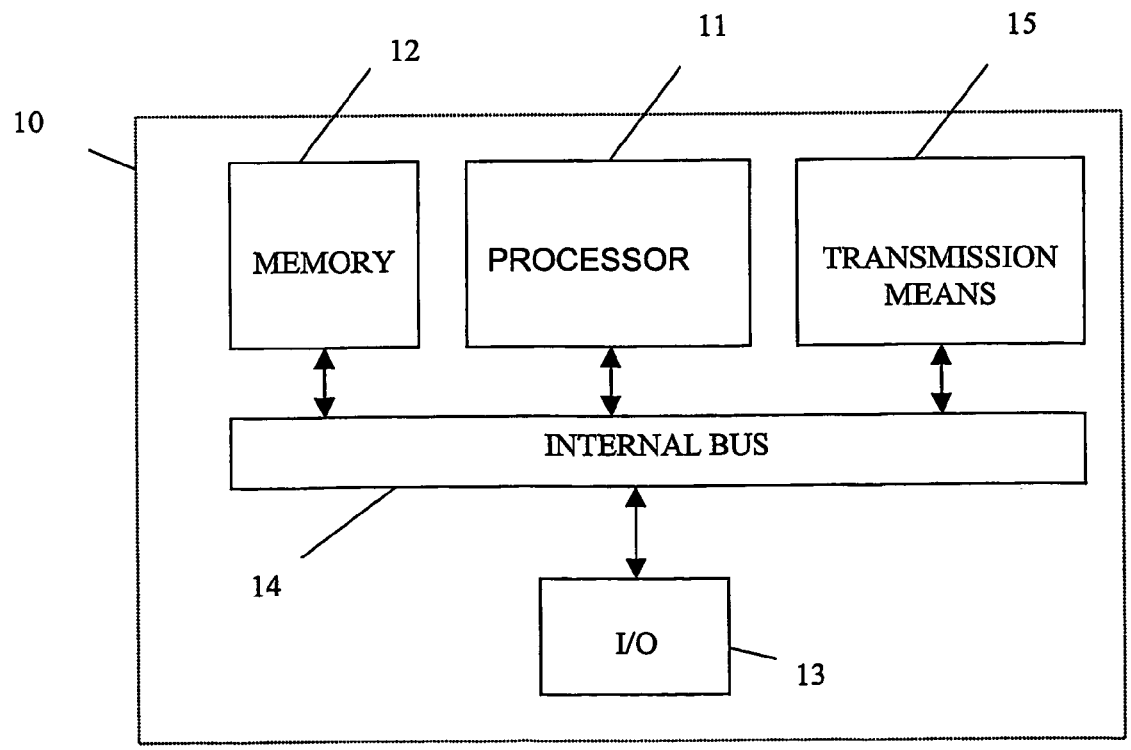
FIG. 2 represents an associated transmitter device.

FIG. 2 shows the general structure of a transmitter device 10. It comprises information processing means or processor 11, information storage means 12 which can be of various types (RAM, EEPROM, ROM), traditional input/output means 13 allowing the transmitter to communicate with the exterior, and a bus 14 allowing these various parts to communicate together. The transmitter also comprises transmission means 15 especially designed to communicate according to the invention with all receivers with which it is associated. For a pay-TV system, these transmission means are designed to transmit images and at least the above-mentioned information K, especially through the use of radio waves.

Although specific embodiments of the invention have been described and illustrated, the invention is not to be limited to the specific forms or arrangements of parts so descried and illustrated. The invention is limited only by the claims.

The invention claimed is:

1. A method of operating a group (G) of receivers and transmitters to make the same information ($K_c$) available to several receivers (1) belonging to the group (G) of receivers, each receiver i in the group (G) comprising a central processing unit (2) and information storage means (3, 4, 5), the storage means storing information ($SA_i$) specific to each receiver i, respectively, the method comprising:
   - enabling each receiver to access information ($b_i$) before making ($K_c$) available; and
   - transmitting a secret key (K) to all receivers, just before making ($K_c$) available;
   - operating each receiver to calculate $K_c$ from a pre-defined relation $K_c=(K, b_i, SA_i)$ where (f) is a given function, (K) is a secret key common to all the receivers, and ($b_i$) is information different for each receiver and for each value of the secret key (K).

2. The method according to claim 1, wherein the function (f) is such that knowing a ($b_i$) and a ($SA_i$), no algorithm is known which could be used to obtain the information ($K_c$) in a realistic time and with non negligible probability, when the secret key (K) is not known.

3. The method according to claim 1, wherein the function is such that, knowing a certain number of ($b_1 \ldots b_n$) for a certain subgroup (G') of receivers, no algorithm is known which could be used, before knowing the current K, in a realistic time and with a non negligible probability, to produce a valid pair ($b_i, SA_i$) with a legitimate ($SA_i$), i not being one of the receivers 1 . . . n of (G').

4. The method according to claim 1, wherein the function f has the format: $f(K, b_i, SA_i)=b_i \oplus E_K(SA_i)$ where $E_K$ is a function depending on secret key (K) and where $\oplus$ designates a group law.

5. The method according to claim 4, wherein the function ($E_K$) is a cryptographic encryption function and (K) a secret key used by this function.

6. The method according to claim 1, wherein the values ($b_i$) are sent encrypted with a key ($K_i$) specific to each receiver of a certain group (G) of receivers.

7. The method according to claim 1, wherein each value ($SA_i$) is a secret value known by the receiver of index i.

8. The method according to claim 1, wherein each ($b_i$) consists of two values $b_{1i}$ and $b_{2j}$ and equally the information specific to each receiver consists of two values $SA_i$ et $SA_j$, such that each receiver, identified by the pair of indices (i,j), combines the corresponding values $b_{1i}$ and $b_{2j}$ with the values $SA_i$ and $SA_j$ to calculate values $K_C1$ and $K_C2$ using said relation, which are in turn combined to access the information $K_C$.

9. The method according to claim 1, wherein the information $K_C$ is a key used to decrypt a digital content.

10. The method according to claim 1, wherein the $K_C$ can be used for several minutes by the receivers, the secret key K is sent several seconds in advance and the values $b_i$ are sent regularly, starting several days in advance.

11. The method according to claim 1, wherein certain receivers find at least some of their values $b_i$ in a list of values prestored in the receivers.

12. A portable receiver object (1) belonging to a group (G) of portable objects and comprising information processing means (2) and information storage means (3, 4, 5), the storage means storing information ($SA_i$) which is specific to the portable object and a given function (f), comprising: means to obtain access to information ($b_i$) different for each portable object of the group (G) and for each value of the secret key (K); and means to calculate information ($K_C$) using a relation $K_C=f(K, b_i, SA_i)$ where K is information common to all the portable objects and transmitted to them.

13. A transmitter device (10) to make the same information ($K_C$) available to several receivers (1) belonging to a group (G) of receivers, each receiver storing information ($SA_i$) specific to it, comprising: calculation means (11) designed to calculate information ($b_i$) using a relation $K_C=f(K, b_i, SA_i)$ where (f) is a given function, (K) is information common to all the receivers and information ($b_i$) is information different for each receiver and for each value of the secret key (K); and transmission means (15) designed to transmit to each receiver, a certain time before making ($K_C$) available, the information ($b_i$) associated with it, and to transmit secret key (K) to all the receivers, just before making ($K_C$) available.

* * * * *